Dec. 27, 1955     D. S. BRINSMADE ET AL     2,728,356
CORRUGATED PLASTIC TUBING
Filed Oct. 16, 1953

INVENTORS
Daniel S. Brinsmade and
Robert L. Hibbard
BY
ATTORNEYS

United States Patent Office 2,728,356
Patented Dec. 27, 1955

2,728,356
CORRUGATED PLASTIC TUBING

Daniel S. Brinsmade, Bethany, and Robert L. Hibbard, Hamden, Conn., assignors to The Connecticut Hard Rubber Company, New Haven, Conn., a corporation of Connecticut Application October 16, 1953, Serial No. 386,506

4 Claims. (Cl. 138—49)

This invention relates to thin-walled flexible tubing constructed of non-elastic macromolecular organic structural material.

Heretofore, the flexibility of plastic tubing has been attributable to the elasticity of the material. Non-elastic plastic has been fabricated into rigid pipe of large diameter, but there has been no response to the many decades of demand for a large-diameter thin-walled flexible plastic tubing.

Heretofore, large diameter thin-walled pipe has been constructed from polyvinylidene chloride, polytetrafluoroethylene, polytrifluorochloroethylene and similar materials. Such non-elastic piping when subjected to bending has tended to buckle, that is, has tended to form a crease in one portion thereof. The geometry of thin-walled large-diameter plastic tubing, whether constructed of plasticized or unplasticized material, has been such that only an extremely small amount of deformation or bending has been feasible prior to buckling. The flow characteristics of fluids in such buckled tubes have been adversely affected.

It is an important object of the present invention to provide tubing constructed of non-elastic plastic such as polytetrafluoroethylene and/or polytrifluorochloroethylene and having the unusual combination of being both thin-walled and flexible.

A feature of the present invention is the provision of a non-elastic plastic tubing having a thin wall characterized by ridges and valleys (that is, convolutions or corrugations) imparting flexibility to the tubing.

In the development of the present invention it was discovered that the peculiarities of non-elastic plastic necessitated the utilization of peculiar structural features in the tube. Numerous factors affect the design of a corrugated tube, such as the inherent stiffness, the modulus of elasticity, the flex life, and related properties of the material, the ratio of the internal radius of the corrugated tube to the minimum radius of curvature about which the tube is to be bent, the ease of bending the corrugated tube, and the expected frequency of flexing.

It is an object of certain embodiments of the invention to provide a corrugated plastic thin-walled tube adapted to withstand much flexing without development of cracks, creases, or similar localized weaknesses. This object is achieved in part by so shaping the ridges and valleys of the corrugations as to distribute the bending stress over relatively wide areas and preventing the concentration of the bending stress along a narrow zone.

In some of the previously designed corrugated tubes, sharp corners or curves of small radii have been provided, at which cracks have developed under adverse conditions. According to the present invention, the minimum radius of curvature of any portion of the ridges and valleys of the corrugated tubing is at least three times the wall thickness at that portion of the corrugated tubing. Moreover, the crests of the ridges and valleys constitute long arcs of at least 150° and not more than 270°, as for example 180° of such large radii arcs, whereby important advantages are obtained over sine-wave and other types of ridges and valleys. Particular attention is directed to that feature of the present invention wherein the radius of the ridges is equal to the radius of the valleys.

In certain embodiments of the present invention, the corrugations are of a continuous helical nature as distinguished from a series of coaxial, separated circular ridges and separated circular valleys.

Figure 1:
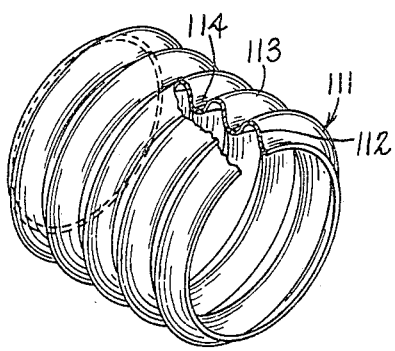
Fig. 1 is a perspective view of one embodiment of a flexible tubing constructed in accordance with the present invention, a portion thereof being cut to show the nature of the cross section.
Figure 2:
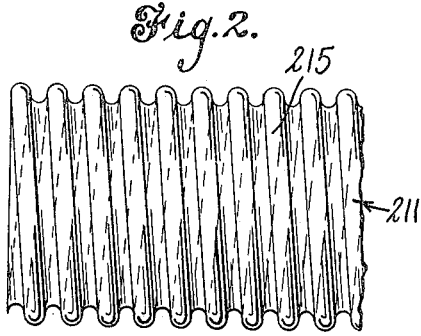
Fig. 2 is a side view of a helical type embodiment of the present invention.

Referring now in detail to the drawings and particularly to Fig. 1, there is shown a flexible tube constructed of non-elastic macro-molecular organic structural material such as polytrifluorochloroethylene. Between the inner radius and outer radius of the tube 111, the thin wall 112 is corrugated or convoluted forming exteriorly extending ridges 113 and interiorly extending valleys 114. The ridges 113 may be a series of circular ridges spaced axially from each other, as shown in Fig. 1, but preferably follow a helical path 215, as shown in a tube 211 in Fig. 2. In any event, the ridges follow a path angularly remote from the axis of the tube.

The ridges and valleys impart flexibility to the tube. All corrugated plastic tubes of the present invention may be bent about an arc of a radius of 20 times the internal radius of the tube without constricting the flow capacity of the tube, and some of the more flexible tubes can bend as sharply as about a radius 8 times the internal radius of the tube.

Particular attention is called to the fact that the wall 112 of the tube 111 is very thin, constituting $\frac{1}{100}$ and not more than $\frac{1}{20}$ of the internal radius of the tube. The difference between the inside radius and the outside radius of the tube is at least five times the wall thickness, the space therebetween being characterized by the ridges 113 and valleys 114.

The plastic corrugated tubes of the present invention may be made of any non-elastic organic material. In preferred embodiments of the invention, the tube is constructed of a relatively stiff unplasticized polytrifluorochloroethylene substantially impermeable to 98% nitric acid and suitable as a flexible hose for transferring this highly corrosive reagent and rocket fuel from one transportation container, such as a tank truck, to another, such as a rocket. Such trifluorochloroethylene has properties very different from tetrafluoroethylene. It has been found that certain varieties of tubing of polytetrafluoroethylene, although not chemically attacked by 98% nitric acid, are sufficiently permeable to this corrosive material as to be unsuitable as a container therefor.

In those applications of flexible tubing in which materials as corrosive as 98% nitric acid are not employed, but in which organofluoride properties are desired, advantageous results are obtained by constructing a corrugated plastic from a member of the polyfluoroethylene class, such as, polytetrafluoroethylene, polytrifluoroethylene, polyvinylidene fluoride, or polyvinyl fluoride. In situations not requiring the chemical inertness of fluorinated plastics, other macromolecular structural materials which are characterized by being non-elastic may be used in the construction of flexible tubes. For example, corrugated plastic tubes having the unique mechanical structure of the present invention can be constructed of vinyl polymers such as polystyrene, polyvinylalcohol, polyvinylchloride, polymethylmethacrylate, or of other plastics such as nylon, polyethylene, or polyvinylidenechloride.

It has been found that organic plastics not only have stiffness characteristics, but also flex life properties, tendencies toward creasing, and other characteristics making it unexpectedly difficult to produce a durable flexible plastic tube having a thin wall, an external diameter greater than the internal diameter by many times the wall thickness, and ridges and valleys imparting flexibility thereto.

Figure 3:
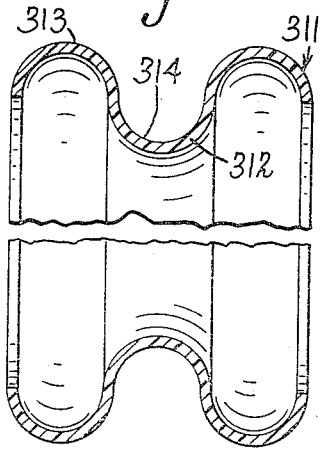
Figs. 3, 4, 5, and 6 are schematic views of a cross section of the wall showing the geometrical relationships affecting certain embodiments of the invention.

In a preferred embodiment of the present invention, as represented schematically in Fig. 3, the ridges 313 and valleys 314 of a tube 311 are each arcs about a radius many times the thickness of the wall 312. By reason of the smooth curve, and especially by reason of the requirement that both the ridges and the valleys have the identical radius, the stresses arising from the bending of the flexible tube are uniformly distributed over a wide area, without the concentration of any stresses in any narrow zone.

Figure 4:
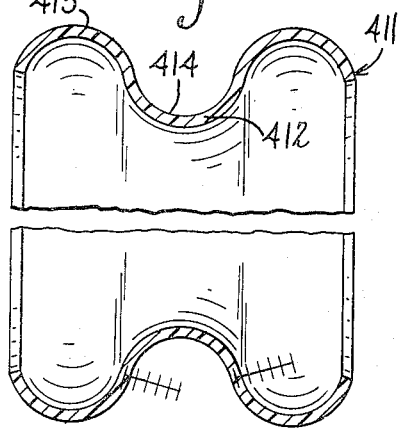

If only a small amount of bending of the tube is desired, the ridges 413 and valleys 414 can constitute arcs of from 150 to 180° about radii several times that of the thickness of the wall 412 of a corrugated plastic tube 411, as indicated schematically in Fig. 4. The arc of the valley 414 and the arc of the ridge 413 should meet tangentially or in such a manner as to avoid any sharp corners or portions curved about a radius less than three times the wall thickness. Moreover, according to the present invention, the radius of the ridge must equal the radius of the valley and both arcs are the same length. This is represented schematically by the scaled radii in Fig. 4.

Figure 5:
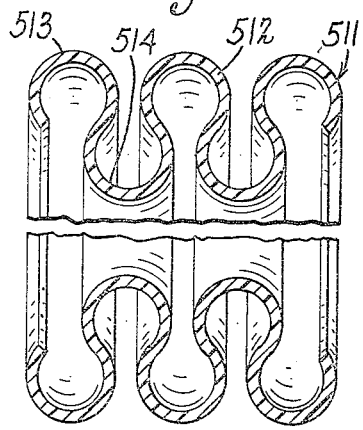

In Fig. 5, a schematic view of a cross-section of another modification shows ridges 513 and valleys 514 formed to constitute arcs of from 180 to 270° about radii several times that of the thickness of the wall 512 of a corrugated plastic tube 511. Particular attention is directed to the fact that in this embodiment as well as in all other embodiments of the invention, the radius of the ridge is equal to the radius of the valley, whereby the bending stresses are more uniformly distributed.

Figure 6:
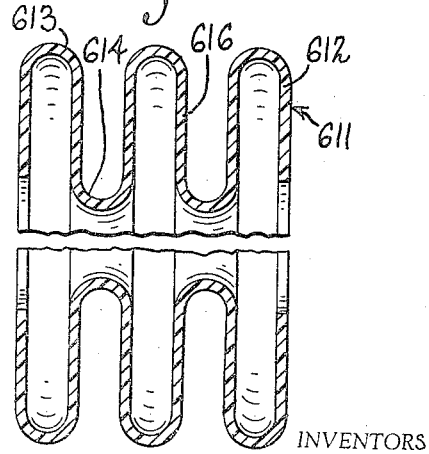

In Fig. 6 there is shown a schematic cross section of still another embodiment of the invention. It is a flexible tube 611 adapted to have the maximum flexibility, and/or constructed of relatively stiff organic structural material. A spacing strip 616 can be positioned between each end of the arc of a ridge 613 and the corresponding portion of the arc of a valley member 614. If the ridges 613 and valleys 614 are semi-circular arcs, the spacing strips 616 will partake of the nature of radial flanges connecting the inner diameter members and external diameter members. If the ridges 613 constitute a single helical thread, the two spacing strips 616 will follow a helical path. Even in the case of the modification utilizing spacing strips, it is important in a flexible tube constructed of non-elastic macromolecular organic structural material to avoid any sharp corners, crease-forming zones, or portions having a radius of curvature less than three times the thickness of the wall 612. As shown in Fig. 6, the arc length and radius of the ridge 613 is equal to that of the valley 614, thereby providing a more uniform distribution of bending stresses.

It will be noted that the difference between the internal radius of the tube and the external radius of the tube is at least 5 times the wall thickness, and in the case of those modifications employing a spacing strip 616 between the ridges and valleys, such as in Fig. 6, at least eight times the wall thickness.

Example 1

A short length of tubing was placed in a blow mold, heated to plasticity, and then subjected to sufficient air pressure to conform to the shape of the mold. The two-piece mold has an inner cylindrical chamber with the groove and valley of a single thread helix corresponding to the external shape of a six-inch length of corrugated tubing having an outside radius of 0.075 inch.

In accordance with the requirements of the present invention, the radius of the ridge-forming portion of the mold was greater than the radius of the valley-forming portion of the mold by approximately the wall thickness of the tube. Thus, the mold was adapted to form the corrugated tube of predetermined wall thickness with ridges and valleys of the same radii.

The apparatus included inlet and outlet plugs adapted to fit on the ends of the tubing being molded for controlling the air pressure and/or stream of air through the tube. The method of molding relied upon the air stream through the tube for helping to cool the tube and mold. The mold was adapted to be used with a press having platens adapted to be both electrically heated and water cooled. A series of measurements indicated that during the heating cycle, the mold tended to be approximately 20° F. cooler than the platens, and during the cooling cycle approximately 5° F. hotter than the platens.

A length of unplasticized trifluorochloroethylene (Kel-F 300 NST) having an outer radius of 0.650 inch and having a wall thickness of approximately 0.012 inch was placed in the mold. The steel plugs were inserted into each end of the tubing and connected with the air pressure controls. A slight air pressure (such as one inch of water) was maintained within the tube during the heating of the mold by the hot platens. It was found advantageous to pre-heat the platens to a temperature of about 450° F. and to then place the mold between the hot platens at a pressure of about 500 pounds per square inch. The platens rapidly heated the mold, which quickly reduced the temperature of the platens to about 380° F. Then the platens were electrically heated for about ten minutes until both the platens and the mold were warmed to the molding temperature of 450° F. Thus, the tube was heated to a molding or thermo-plastic temperature.

Then the pressure on the inside of the tube was increased to approximately 25 pounds per square inch, thereby forcing the tube to expand into and assume the shape of the mold. The molding operation itself required less than one minute. Thereafter, the molded tube was rapidly quenched by air cooling, a stream of air at room temperature being rapidly passed through the tube while also applying cooling water to the platens. The air-cooling quenching was continued until the temperature of the platen was reduced to about 250° F. The Kel-F material is desirably quenched for the temperature range within 410° F. to 350° F., but rapid cooling to a lower temperature provided a greater assurance of satisfactory molded articles. Water cooling of the platens was continued until the temperature of the platens was reduced to a handling temperature of about 150° F. The cooling cycle required about 15 minutes. Then the pressure on the mold was released and the mold was removed from the platens, disassembled, and the flexible tube removed therefrom.

The helically corrugated portion of the Kel-F tube was quite flexible by reason of the ridges and valleys of the thin wall. The internal radius of the corrugated portion was 0.620 inch and the outer radius was 0.740 inch, there being some shrinkage of the plastic upon cooling from the molding temperatures. The corrugated portion had a wall thickness of 0.008 inch or about ⅔ of the thickness of the cylindrical tube from which it was molded.

Particular attention is directed to the fact that the radius of the ridge and the radius of the valley were identical and were 0.075 inch. Moreover, the ridges and valleys were identical both as to arc length and radius. The ratio of the wall thickness to the internal radius was approximately 1 to 77, the radius of the wall thickness to the radius of the ridges and valleys was 1 to 9, and the difference between the internal radius and external radius was approximately 15 times the wall thickness.

Example 2

A flexible tube was constructed of plasticized trifluorochloroethylene (Kel–F 300 T25), following a molding procedure similar to that of Example 1, and found to have desirable flexibility characteristics.

Example 3

Several lengths of trifluorochloroethylene tubing having an outer diameter of approximately 1.3 inches but having various wall thicknesses were molded into flexible tubes having an outer radius of about 0.075 inch. In certain instances, the thin-walled tubing was not available commercially, and was prepared by wrapping Kel–F film about a mandrel, and heating to a molding temperature. Sheets of tetrafluoroethylene film prevented troublesome adhesion of the trifluorochloroethylene to the mandrel or heating jacket. Even at the molding temperature, the trifluorochloroethylene did not dissolve significant amounts of the tetrafluoroethylene film. A cylindrical tube having an outer diameter of 1.3 inches and a wall thickness of 0.018 inch was thus constructed from Kel–F film. This was formed into a flexible tube by expansion in a blow mold. The helically corrugated tube was less flexible than the tube of Example 1.

Example 4

A helically corrugated tube was constructed from polytrifluorochloroethylene by methods such as outlined in Examples 1, 2 and 3, and subjected to various physical tests. The corrugated polytrifluorochloroethylene tubing was subjected to a flexing test in which one end of the eight-inch tube was oscillated through a one-inch cycle at two cycles per second for more than 5,000,000 flexings without any evidence of failure.

The tube was bent without distortion about a radius ten times that of the internal radius of the tube, or approximately 6¼ inches. Although, prior to molding, the tube was readily collapsed by a small vacuum, the helical corrugation strengthened the tubing sufficiently that it could withstand a full vacuum. Moreover, the tube withstood an internal pressure of 300 lbs. per square inch.

The flexible tube was tested to determine the permeability of 98% nitric acid therethrough. Notwithstanding the very thin wall of the tube, it was so impermeable to 98% nitric acid that the transmission through the wall was not readily detected. Accordingly, such tubes are suitable as flexible tubing for the transfer of 98% nitric acid from one container to another, such as from a tank truck to a rocket.

Example 5

A flexible tubing similar to that of Example 1 might be prepared from polytetrafluoroethylene. Such a tubing would be useful as a flexible connector for high temperature lubricants, such as dioctyladipate or other diesters employed as lubricants about 350° F.

Example 6

A flexible tube might be constructed as outlined in Example 1 but employing nylon as the organic structural material. Such a flexible tube would be useful as a fuel line at arctic temperatures.

Example 7

A corrugated tubing having both the ridges and valleys of the identical radius and arc length could be constructed of polyethylene to provide a flexible connector useful for the transfer of mineral acids.

Example 8

A flexible tubing could be constructed of a vinyl polymer, such as polyvinylchloride, polyvinylacetate, polyvinylalcohol, polymethylmethacrylate, or other vinyl polymer. Such tubing would be useful in the transfer of water and other liquids regularly employed in polyvinyl tubing.

Example 9

Polyvinylidenechloride tubing could be shaped into a bellows having a helix-type ridge, and employed for the transfer of hot acid solutions.

The invention claimed is:

1. A flexible tube constructed entirely of non-elastic macromolecular organic structural material, said tube having an axis, a thin wall, an internal radius at least 20 times the wall thickness, an external radius greater than the internal radius by at least 5 times the wall thickness, said wall forming ridges and valleys between said internal and external radii, said ridges and valleys following paths angularly remote from axial, said ridges and valleys being arcs of more than 150° but less than 270° of radii more than three times the wall thickness, the length and radii of the arcs of the ridges and valleys being identical, and said tube being sufficiently flexible that a length of the tubing can bend about an arc of a radius 20 times the internal radius of the tube without constriction of the flow capacity thereof.

2. A flexible tubing according to claim 1, in which the ridges and valleys are each semicircular arcs and in which a spacing strip is tangentially connected with both the ridges and valleys to provide a difference between the inside and outside radii of the tube at least ten times the wall thickness.

3. A flexible tube characterized as constructed of a non-elastic macromolecular organic structural material; having relatively thin walls, the inside radius of the tube being at least 20 times the wall thickness; having ridges and corresponding valleys between the ridges, said ridges being angularly remote from axial, the radius of the ridges being at least three times the wall thickness and the radius of the valleys being at least three times the wall thickness; the outside radius of the tube being greater than the inside radius by at least five times the wall thickness and sufficiently flexible that a length of the tubing can bend about an arc of a radius 20 times the internal radius of the tube without constriction of the flow capacity thereof.

4. A flexible tube constructed entirely of nonelastic macromolecular organic structural material selected from the class consisting of polyethylene, polytetrafluoroethylene and polytrifluorochloroethylene, said tube having an axis, a thin wall, an internal radius at least 20 times the wall thickness, an external radius greater than the internal radius by at least 5 times the wall thickness, said wall forming ridges and valleys between said internal and external radii, said ridges and valleys following paths angularly remote from axial, said ridges and valleys being arcs of more than 150° but less than 270° of radii more than three times the wall thickness, the length and radii of the arcs of the ridges and valleys being identical, and said tube being sufficiently flexible that a length of the tubing can bend about an arc of a radius 20 times the internal radius of the tube without constriction of the flow capacity thereof.

References Cited in the file of this patent

UNITED STATES PATENTS

| | | |
|---|---|---|
| 1,120,268 | Brinkman | Dec. 8, 1914 |
| 1,554,739 | Lewis | Sept. 22, 1925 |
| 2,299,520 | Yant | Oct. 20, 1942 |
| 2,307,817 | Austin | Jan. 12, 1943 |
| 2,371,991 | Harding | Mar. 20, 1945 |
| 2,563,578 | Candee | Aug. 7, 1951 |
| 2,594,842 | Bailey | Apr. 29, 1952 |